G. W. ODELL.
RECORDING MACHINE FOR MECHANICALLY DETERMINED CALCULATIONS.
APPLICATION FILED MAY 19, 1919.
1,406,066.
Patented Feb. 7, 1922.
5 SHEETS—SHEET 1.
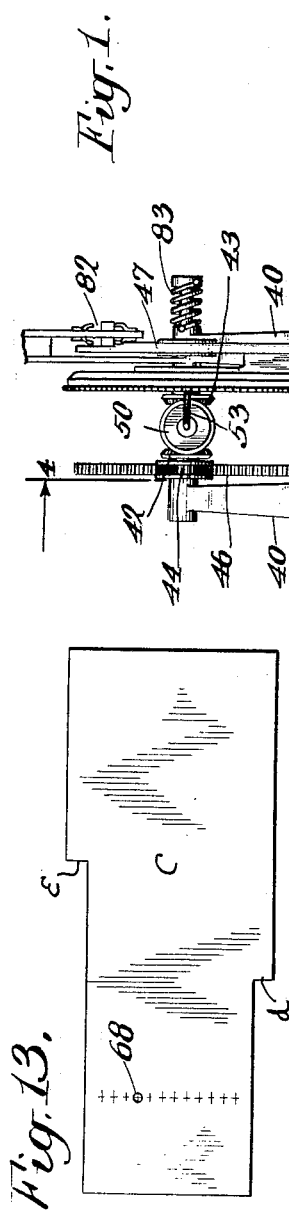

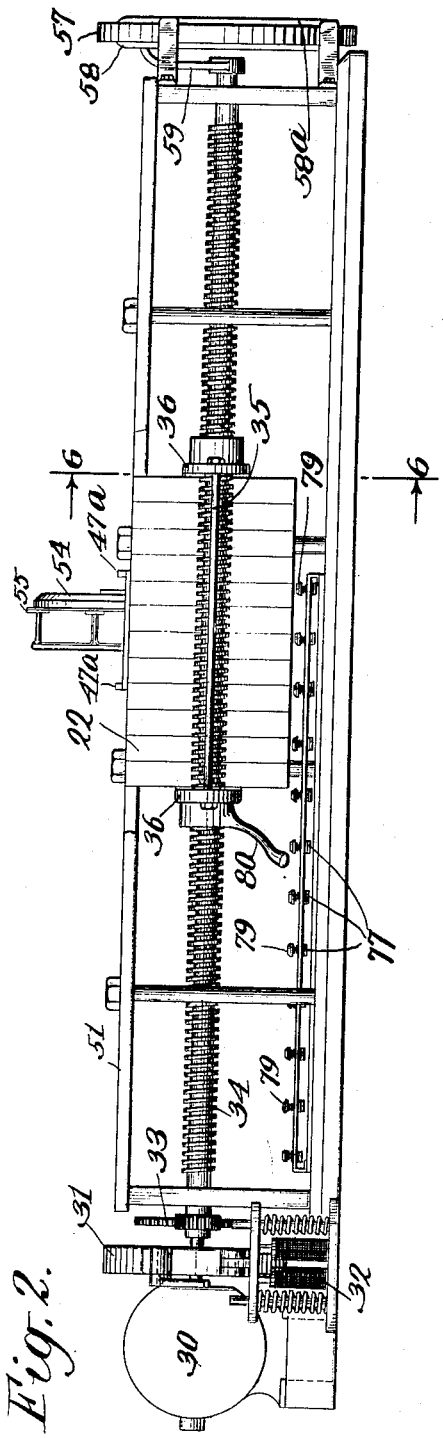

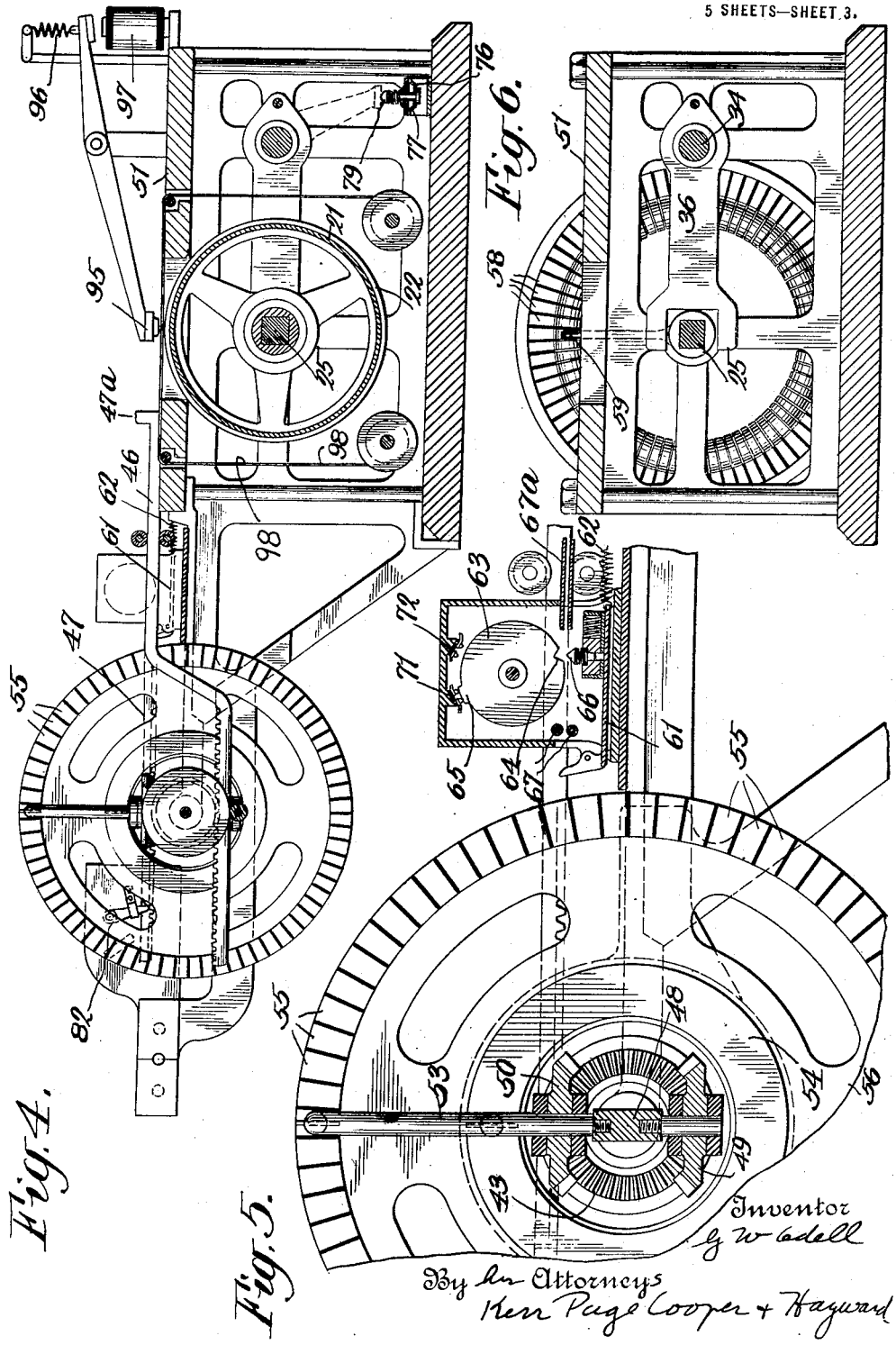

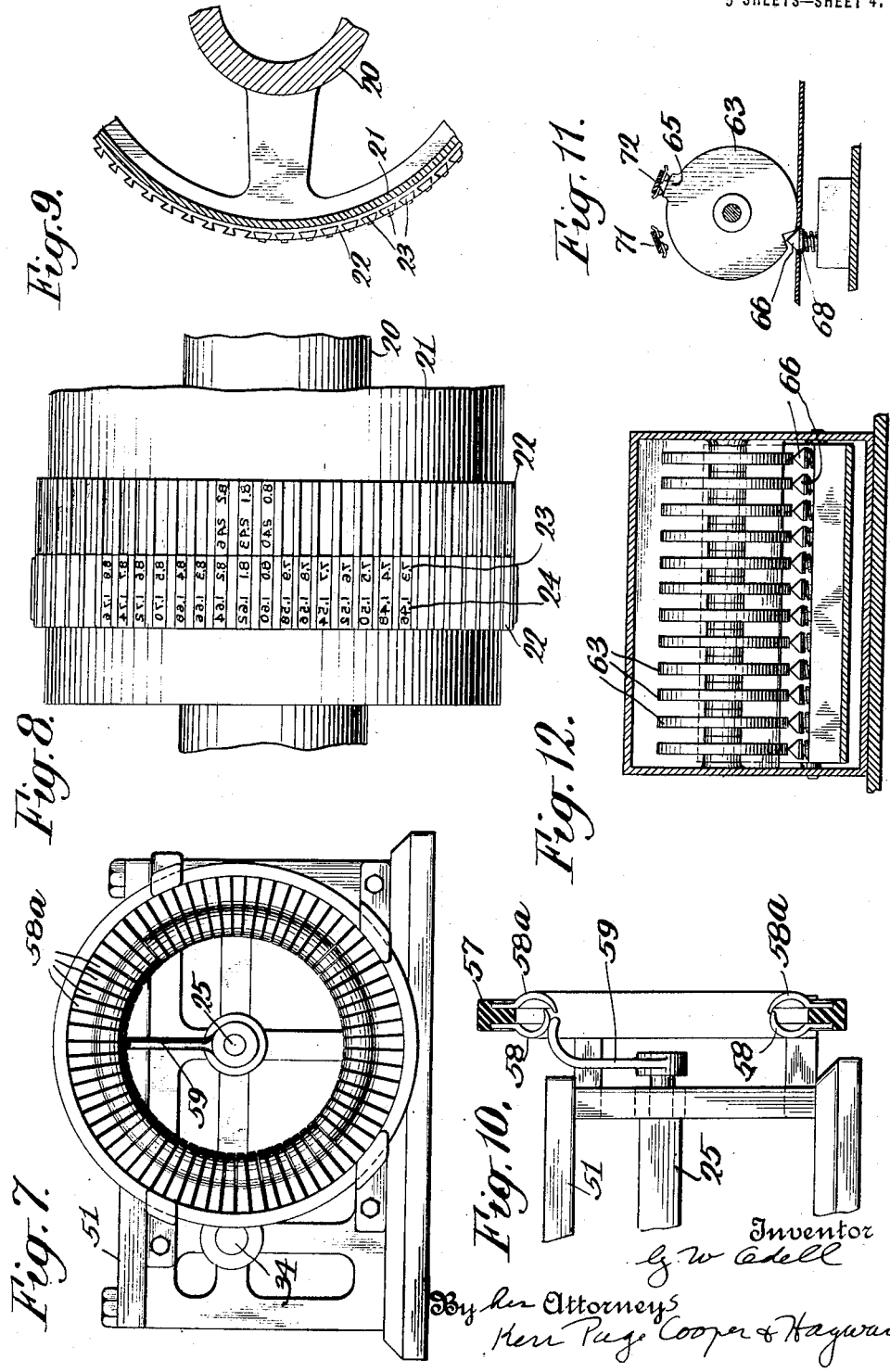

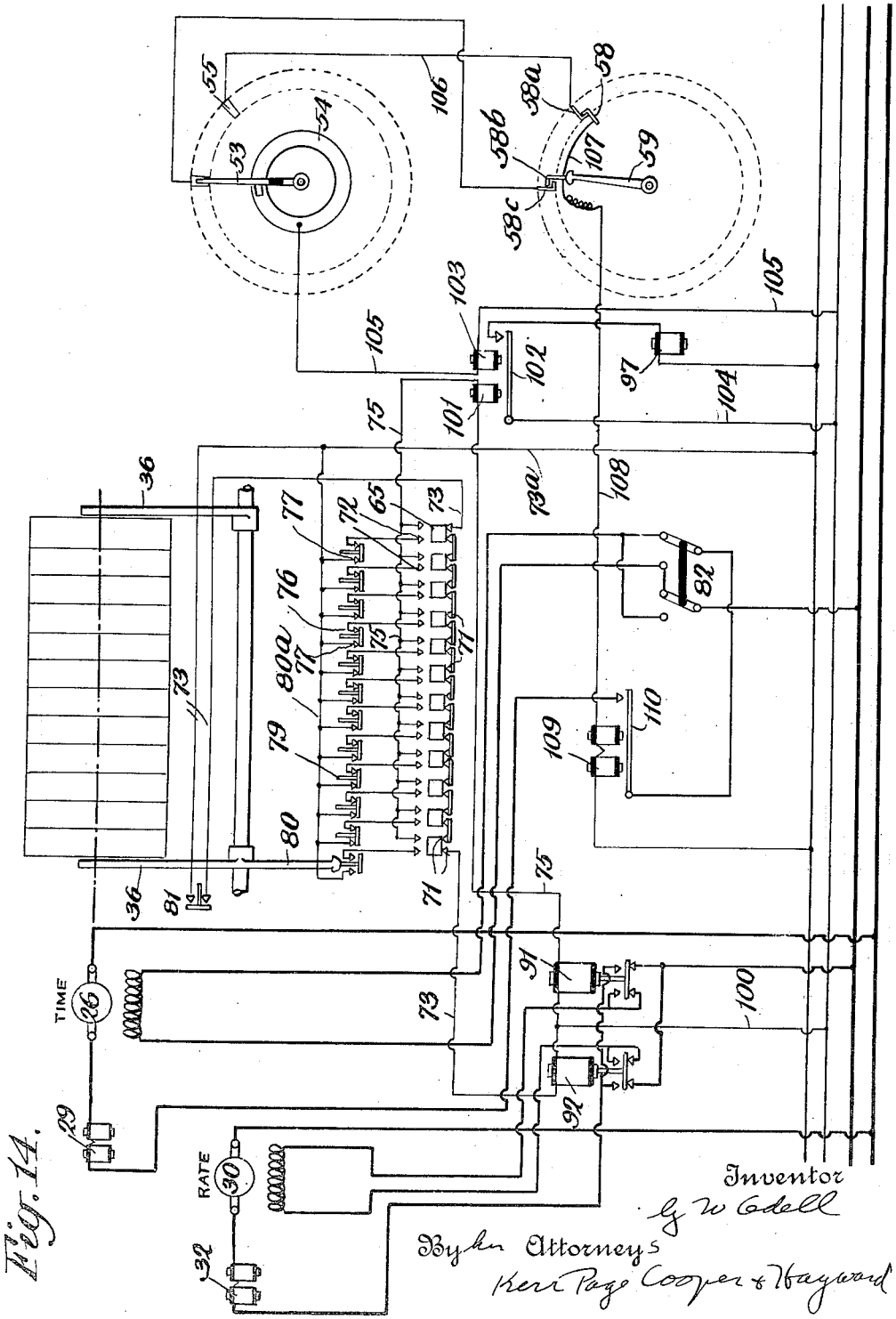

UNITED STATES PATENT OFFICE.

GEORGE WILLIAM ODELL, OF MONTREAL, QUEBEC, CANADA, ASSIGNOR TO COMPUTING-TABULATING-RECORDING COMPANY, OF NEW YORK, N. Y., A CORPORATION OF NEW YORK.

RECORDING MACHINE FOR MECHANICALLY-DETERMINED CALCULATIONS.

1,406,066. Specification of Letters Patent. Patented Feb. 7, 1922.

Application filed May 19, 1919. Serial No. 298,290.

*To all whom it may concern:*

Be it known that I, GEORGE WILLIAM ODELL, a subject of the King of Great Britain, and residing at 298 St. James Street, in the city and District of Montreal, in the Province of Quebec, in the Dominion of Canada, have invented a new and useful Recording Machine for Mechanically-Determined Calculations, of which the following is the specification.

The present invention has for one of its objects the provision of a calculating machine which will automatically perform a series of calculations in accordance with the characteristics of a card which is inserted in the machine.

A further object of the invention is to provide a machine in which type will be automatically selected in accordance with the elapsed time and rate characteristics of an inserted card, and in which the selected type character or characters will be thereafter printed upon the card.

A further object of the invention resides in the provision of a machine which will automatically calculate the elapsed time from a card which is notched to correspond with the elapsed time of a transaction.

A further object of the invention resides in the provision of a machine which will automatically calculate a cost for the calculated elapsed time and from a rate designating deformation on the card.

The objects of the invention are to devise a machine for installation at factories, works or other places, that will facilitate the calculation of costs in work performed; to economize in the matter of clerical assistance; to establish a system, which for accuracy will leave no room for question, as the type of the recording element are in predetermined arrangement and there need be no tables or lists on the cards requiring registry with machine parts; and generally to insure correct accounting and efficiency by systematic methods in industrial establishments and provide a machine simple as to its operation and of comparatively cheap construction.

In the drawings,

Fig. 1 shows a plan view of the machine.

Fig. 2 is a side elevation.

Fig. 3 is a rear elevation with certain parts shown in section.

Fig. 4 is a sectional view taken on line 4—4 of Fig. 1.

Fig. 5 is a detail view of the time selector and the differential actuator and also shows the rate selector.

Fig. 6 shows a sectional view taken on line 6—6 of Fig. 2.

Fig. 7 shows an end view of the machine.

Fig. 8 is a detail enlarged view of the type drum.

Fig. 9 is an end view of the same.

Fig. 10 is a sectional view of the time controller selector.

Figs. 11 and 12 are details showing side and end views of the rate selectors.

Fig. 13 is a detail view showing the card used in the machine.

Fig. 14 is a diagrammatic view of the circuit connections from the motors to the time and rate selectors and other parts.

For a clear understanding of the machine a brief statement of the general mode of operation will be given.

In its broad aspect the machine comprises a drum which is rotatable to varying degrees in accordance with elapsed time and shiftable axially to varying extents in accordance with varying rates. These rotary and axial movements are automatically performed by separate electric motors and the extent of rotary and endwise movement is electrically controlled by time and rate selectors which are controlled by the inserted card.

After the drum has been selectively shifted to bring a type carried thereby to the printing point, the printing operation is effected automatically. The drum is then returned to normal home position.

The drum constitutes a type carrier and comprises a hub section 20 having an integral spoke and rim body section 21. This rim section receives and has secured thereto a number of outer rim sections 22 which are provided with undercut grooves to receive time and value types 23 and 24 (see Fig. 8).

The type can be removed from the rim sections and other type substituted and if desired the rim sections 21 can be removed from the rim body 21 and replaced with other sections having different type thereon.

It will be understood that each section carries both time and value type and that the number of sections to be used will depend upon the number of rates for which the machine is to be operated. Each section carries value type corresponding to its own rate. The time type groups upon the different sections are alike in each longitudinal row.

It will thus be seen that the time types are identical in the several sections longitudinally and progressive circumferentially in each section and that the value type are progressive both longitudinally and circumferentially.

The drum is mounted upon a squared shaft 25 and is free to slide endwise thereon. Shaft 25 is connected to a time motor 26 by means of gearing 27 (Fig. 1), and the motor shaft is provided with a brake 28 which is spring operated and magnetically released by means of a solenoid 29 when the rotation of the shaft is to be stopped.

In order to advance the drum axially and bring the various rate sections to the printing point, a rate motor 30 is provided. This motor is provided with a similar spring and magnetic brake 31, 32 and through gearing 33 rotates a lead screw 34. A carriage 35, including a pair of forked arms 36, is carried by this lead screw so as to be advanced by it as it turns and cooperates with the drum to shift the same endwise upon the rotation of the lead screw by the rate motor.

To control the operation of the time motor in accordance with the characteristics of a card, I provide certain time selecting devices which will now be described. Broadly the mode of operation may be stated to select a circuit mechanically by a card, and to then establish a motor circuit and to thereafter break this previously established circuit by the movement of a supplemental selector which is moved by the motor. This mode of operation is used for both the time and rate motor controlling devices.

Disposed at the rear of the drum, as shown in Fig. 1, are brackets 40 which support a differential device (see Figs. 1, 3, 4 and 5). This differential comprises bevels 42 and 43 which are connected to pinions 44, 45. These pinions are actuated by racks 46 and 47, one, 46, being bent downwardly to engage the lower side of the pinion 44 and the other having teeth facing downwardly and engaging the top of pinion 45.

Both racks 46 and 47 have upturned ends 47ª to cooperate with the notched edges d—e of a card C such as shown in Fig. 13 and in dotted lines in Fig. 1. The card is placed in position by hand upon the card table 51 which is slotted at the printing line as best shown in Figs. 1 and 4.

A spider bearing block 48 is rotatably supported upon pins which extend from the bevels 43 and 42 and this block carries pins which form a support for the intermediate bevels 49, 50. A rod or selector arm 53 is rigidly carried by the bearing block and forms the journal for bevel 50 (see Fig. 5).

On account of one rack engaging the bottom of the pinion and the other rack engaging the top of its pinion, one pinion will be turned clockwise and the other anti-clockwise upon the pushing in of the racks by the manual advance of the notched card.

The result of this operation is that so long as the rack 46 is being actuated by the advancing card, the complete gear mechanism swings with the rotation of pinion shafts in their bearings but the moment the other rack is engaged by the card the effect of the former push is neutralized and the gear mechanism remains stationary. By the differential device the sector arm 53 is thus displaced to an angular amount which corresponds with the elapsed time represented by the distance between the notches on the card. After being thus displaced the sector arm 53 remains stationary in contact with a selected contact until the card is removed. The arm 53 carries a pair of brushes or contact shoes which sweep over a series of insulated contacts 55 and over a common contact ring 56. The common ring and the contacts are both carried by a disc 54. The brushes are suitably electrically connected so that a selected contact 55 will be rendered live from the common contact ring, upon the displacement of the sector by the differential device.

At the end of the machine is a disc 57 (see Fig. 10) which carries a plurality of circumferentially spaced pairs of contacts 58 and 58ª. The contacts 58 are all electrically connected and the successive contacts 58ª are insulated from each other. Normally the contacts 58 and 58ª are resiliently engaged but this engagement may be broken by means of an arm 59 which is carried by the end of the drum shaft. Contacts 58ª correspond in number to the previously described contacts 55 and are each individually connected to corresponding contacts on disc 54.

It will therefore be understood that current may flow from the energized live contact of group 55 through the selected line to the connected contact 58ª and through this contact to the common contacts 58 until such time as the arm 59 effects a disconnection of the selected energized contact 58ª. Thereafter this circuit will be broken.

In practice it is found desirable to use currents of different intensity and voltage for the controlling and motor operating currents. I therefore provide main live wires and low voltage control leads as shown in the light and heavy lines in Fig. 14.

The method of obtaining this control of the so-called rate circuits will now be described.

A tilting card tray 61 is pivotally mounted between the racks 46 and 47 (Fig. 5). This tray is normally maintained horizontal or substantially so by a spring 62 and has an end projecting upwardly in the path of the edge of the card so that the tray will be rocked anti-clockwise by the insertion of a card. The tray is mounted in a suitable housing which has a shaft to independently rotatably support a series of controlling discs 63. Each controlling disc has a notch such as shown at 64 in the lower edge and also has a projecting cam portion 65. Mounted upon the tray is a series of yielding mounting spear fingers 66.

The housing is slotted to receive a card and is provided with guide rollers 67. Suitably cooperating card guides 67$^a$ may also be used. Each card has a controlling aperture 68 (see Fig. 13) which is located thereon at a particular point transversely of the card to designate the rate of that particular card. Upon the insertion of a card into the housing the spear fingers are all yieldingly pressed against the card by the tray being tilted upwardly and when the controlling aperture aligns with a particular spear point, that spear point passes through the hole in the card and enters the notch 64 in the corresponding disc. Thereafter a further forward movement of the card will cause the controller disc, thus selected and engaged, to be rotated from the normal position shown in Fig. 5 to the displaced position shown in Fig. 11. In normal position the contacts 71 are closed by the cam surface 65 and in the displaced position contacts 72 are closed and contacts 71 opened. The removal of the card restores the discs to normal position, opens contacts 72 and closes contacts 71. There are a pair of contacts 71 and 72 for each rate and these contacts are selectively operated so that with the card out of the machine all the contacts 71 will be closed, and contacts 72 will all be open. With the card in place all contacts 71 with one exception will be closed and a pair of contacts 72 corresponding to these will be closed.

Referring to the diagrammatic circuit (Fig. 14) all the contacts 71 are serially connected in a line 73. One side of contacts 72 are connected to a common line 75 and the other complementary contacts are individually connected to contacts 76. Cooperating contacts 77 are in turn connected to a common line 80$^a$. These contacts 77—76 are adapted to be opened and closed by bridging connections or spring plungers 79 (see Figs. 2 and 4). The springs hold these plungers normally up and normally maintain all contacts closed. A presser foot 80 carried by the forked frame 35 is adapted to move with the frame and successively open these contacts (see Figs. 1 and 2). Line 73 is provided with a limit switch 81 which is adapted to be opened when the drum moves to the limit of its travel in one direction.

In the diagram, Fig. 14, 82 represents a reversing switch which is also shown in Fig. 4. This switch is thrown one way when the rack 47 moves to its extreme inner position and is thrown in the other direction when the rack moves to outer position. As shown in Fig. 1 the differential device and associated parts are automatically restored to normal position after the removal of a card by coil spring 83. The function of the switch 82 is to reverse the direction of rotation of the time motor and so that the drum may be restored to zero position after the removal of a card.

The direction of rotation and the establishment of a circuit from the main leads to the rate motor 30 is controlled by solenoid switches having controlling solenoids 91 and 92. Such devices are well known in the art. It is sufficient to say that when 91 is energized the rate motor operates forwardly and when 92 is energized the motor operates in reverse direction. With both deenergized the motor is stationary and the brake is applied (magnet 32 being deenergized).

After the drum is displaced to proper position a printed impression of the selected time and value type is impressed upon the card by a printing platen 95 (see Fig. 4). The platen is impelled against the type by a spring 96 which had been previously put under tension by a magnet 97. A suitable ink ribbon 98 is provided which is advanced by a suitable ribbon feeding device, not shown.

The complete operation of the machine will now be explained. This operation may be best understood by referring to Fig. 14. It will be assumed that a card has been placed in the machine, the rate controller 65 (see dotted line position in Fig. 14) shifted into contact with contacts 72 and the arm 53 shifted by the differential device to contact with a particular segment 55 as shown. Control current will now flow from the low voltage line through wire 100, magnet 91, wire 75, magnet 101, contacts 72, closed contacts 76, 77, switch member 79, line 80$^a$, wires 73$^a$ and back to the control line. Magnet 91 being energized starts the rate motor 30 in a forward direction and releases the magnetic brake 32—31. During this operation magnet 92 is deenergized since the circuit of line 73 is broken at open contacts. Magnet 101 being energized then picks up a relay arm 102 and establishes a circuit from the control leads through wires 104 to the printing magnet 97.

Concurrently or earlier or later a second time control circuit will be established as follows: through wire 105 and magnet 103 (thereby picking up relay 102 and establishing the printing circuit if the same has not already been made) to common ring 54. Thence through selector arm 53, contact block 55 and through the individual line 106 to contact 58ⁿ. 58 and 58ⁿ are now closed and current flows through them to common wire 107, wire 108, and magnets 109 to the other side of the control line. The energization of magnet 109 picks up a relay arm 110 and establishes a circuit to the time motor 26 which thereafter revolves in a forward direction, switch 82 having previously been thrown to determine this direction of rotation. The time motor then rotates the drum. During this rotation the drum may be shifted longitudinally but even should this longitudinal shifting stop, and magnet 101 be deenergized, the magnet 103 will hold the relay 102 up and maintain the printing magnet circuit energized. As the drum revolves the arm 59 moves over the successive contacts 58 successively opening them without effect until the contact cooperating with the live contact 58ª is reached. When this contact is opened the control circuit through line 108 and control magnet 109 will be broken. Forward rotation of the drum will then stop with the proper type corresponding to the elapsed time at the printing point. The brake magnet 29 will be deenergized to permit the brake to be applied and lock the drum against further rotation.

The rate motor in the interim will have shifted the drum longitudinally and will have shifted the presser foot 80 to the right successively and ineffectively opening contacts 77—76 until the live contact connected through 65 with line 75 is reached. Thereupon the control circuit for the rate motor will be interrupted and the motor stopped by magnet 92 being deenergized. The brake on the rate motor will then be applied as before. The rate motor will have positioned the drum with the proper rate row of type at the printing point. The actual time of completion of this rate shifting movement may be before or after the drum has completed its time rotation.

When the advance of both time and rate motors has been completed, both control circuits will be broken and magnets 101 and 103 both deenergized. This will allow relay arm 102 to fall and break the circuit 104 which had previously been maintained through the printing magnet 97. The time and value imprint is then impressed upon the card by spring 96.

After the card is printed, the parts are to be restored to their home positions. This is effected in the following manner. The removal of the card, as previously explained, establishes contacts 71 and breaks contacts 72. Magnet 91 is now deenergized and 92 energized. Current flows from line through 100, magnet 92, line 73, contacts 71 now closed, wire 73 and limit switch 81 (now closed) and back to line. The energization of 92 reverses the circuit connecctions to the rate motor 30 and causes the drum to be restored in a longitudinal direction. This motion is finally interrupted by the contact of a part moving with the drum against the limit switch 81. The return rotary movement of the drum is effected as follows: The removal of the card allows the differential device to be restored by its spring. This movement throws the switch 82 to the opposite position to reverse the circuit connections to the rate motor. However the motion of the sector arm 53 causes it to establish a circuit through one of the other lines, corresponding to 106, to a pair of contacts 58, 58ª which are not open. The control circuit magnet 109 is then energized lifting arm 110 and establishing the reverse motor circuit previously determined by 82 which had been thrown to reverse position. The rearward motion continues until the control circuit is again interrupted by the conjoint action of the sector 53 and the opened home contacts 58ᵇ and 58ᶜ.

What I claim is:—

1. In a recording machine for mechanically determined calculations in combination, a card support, a time and value printing mechanism, and means operable automatically under the control of an inserted card for bringing the said printing mechanism to proper position to print time and value imprints upon said card in accordance with the time and value configuration thereof.

2. In recording machines for mechanically determined calculations, an operating instrument in card form, a frame, a printing mechanism having time and value grouped in type form, means controlled by said instrument for shifting said type groups in selecting operations and automatically reversible, and means for imparting another movement to said type groups, said movements being regulated by and in agreement with the physical form of the card.

3. A recording machine for mechanically determined calculations adapted to be controlled in its action by an inserted card comprising in combination, a printing mechanism having a rotary member carrying type groups denoting time and value and disposed thereon in longitudinal and circumferential rows, means for shifting said rotary member to select a particular longitudinal row, means for rotating said member to select a circumferential type row and control devices operable by the insertion of a card and in accordance with the time and value configuration thereof for automatically setting the aforesaid shifting means into operation and controlling the extent of movement thereof.

4. In recording machines for mechanically determined calculations, an operating instrument in card form, a frame, a printing mechanism having a rotary member and type showing time and value as group members in longitudinal and circumferential rows thereon, means including an automatic stop member and reverse mechanism for selecting a circumferential row, and means including a stop and reverse mechanism for finding the other group member in a longitudinal row in agreement with said card.

5. In recording machines for mechanically determined calculations, an operating instrument in card form, a frame adapted to receive said card, a rotary member carrying type showing time and value as group members and arranged in longitudinal and circumferential rows, a shifting mechanism mounted adjacent to and engaging said rotary member and actuated by the insertion of said card and automatically stopped and reversed and a rotating mechanism operating in combination with the aforesaid shifting movement and in finding the particular group in agreement with said card.

6. In a recording machine for mechanically determined calculations a card support, a rotatable and axially shiftable drum, time and value type groups upon said drum, certain of said type groups progressing in amount circumferentially of the drum and other of said groups progressing in amount axially of the drum, a means operable by the insertion of a card for automatically imparting rotation to said drum, means controlled by the configuration of the inserted card for automatically stopping said rotation when the drum is rotated to the proper extent, and means for axially shifting said drum to bring the proper lateral type group to printing position.

7. In recording machines for mechanically determined calculations, an operating instrument in card form, a frame adapted to receive said card, a rotator shaft journalled in said frame, a rotator carrying type arranged in ring sections and in groups of time and value in said sections, a screw shaft, a carriage travelling on said screw shaft and shifting said rotator means for driving said shafts, a stop member actuated by said card for limiting the travel of said carriage, and a stop mechanism operated by said card for limiting the rotation of said rotator in agreement with the elapsed time indicated by said card.

8. In recording machines for mechanically determined calculations, an operating instrument in card form, a frame adapted to receive said card, a rotator shaft journalled in said frame, a rotator carrying circumferential and longitudinal rows of type in time and value groups, a screw shaft journalled in said frame, means for driving said shafts actuated by the insertion of said card, a carriage shifting said rotator and mounted on said screw shaft, a stop mechanism operated by said carriage in its travel and arresting the same, and a stop mechanism arresting the rotation of said rotator shaft and operated by said card.

9. In recording machines for mechanically determined calculations, an operating instrument in card form, a frame adapted to receive said card, a rotator shaft journalled in said frame, a rotator carrying circumferential and longitudinal rows of type in time and value groups, a screw shaft journalled in said frame, means for driving said shafts, a carriage having nuts forming runner members on said shaft, and arms engaging said rotator at the ends, members connected with driven mechanism and engaged from said carriage in its forward and reverse movements for stopping the shifting motion of said rotator and a member operated by said rotator for stopping its rotation at a selected time.

10. In recording machines for mechanically determined calculations, an operating instrument in card form, a frame having provisions for receiving said card, a rotator shaft journalled in said frame, a rotator thereon, time and value types upon said rotator, a motor for driving the rotator, electrical controlling connections therefor, electrical switches in said connections operated by said card for breaking the said circuit to stop the operation of the rotator, and means controlled by the card for selecting the value type group from which a record is to be taken.

11. In a recording machine for mechanically determined calculations, an operating instrument in card form, a rotator carrying type motive power, means for driving the electrical controlling connections therefor, an electrical switch in said connections operable upon the insertion of a card for closing a selected circuit to the power means and thereby setting into operation said rotator, a supplementary switch for breaking the said selected operating circuit, said switch being controlled selectively by the inserted card and operated by the rotator when the latter has been moved to an extent in accordance with the time configuration of the card.

12. In recording machines for mechanically determined calculations, an operating instrument in card form, a frame adapted to receive said card, a rotator shaft journalled in said frame, a rotator on said shaft and carrying type, motive power electrical connections, electrical switch in said connections operated by the insertion of said card for starting said motive power, electrical switches in said connections for breaking the operating circuit, gear mechanism having racks and pinions and communicating gears and an arm therefrom for selecting the operating circuit, and means for shifting said rotator in selecting movements.

13. In recording machines for mechanically determined calculations, an operating instrument in card form, a frame adapted to receive said card, a rotator shaft journalled in said frame, a rotator carrying type and supported by said shaft, motors, electrical connections, electrical switches in said connections operated by the insertion of said card for starting said motor, electrical switches in said connections for breaking the operating circuit, gear mechanism for selecting the operating circuit and having pinions operated by racks in different directions and communicating gears, and bearings for said racks and gears.

14. In recording machines for mechanically determined calculations, an operating instrument in card form, a frame adapted to receive said card, a rotator shaft journalled in said frame, a rotator mounted on said shaft and carrying type, motive power, electrical connections, a controlling switch operated by the insertion of said card for starting said motor, electrical switches in said connections for breaking the operating circuit, gear mechanism having pinions operated in opposite directions by racks, bevel gears rotated by said pinions, and communicating bevel gears carrying a switch operating arm bearings for said racks forming guides for said card.

15. In recording machines for mechanically determined calculations, an operating instrument in card form, a frame adapted to receive said card, a rotator shaft journalled in said frame, a rotator mounted on said shaft and carrying type, a motor, electrical connections, a controlling switch in said connections operated by the insertion of said card for starting said motor, electrical switches in said connections for breaking the operating circuit, bevel gears mounted on shafts journalled in bearings supported from said frame, said shafts being journalled in a central bearings, a bevel gear connecting the aforesaid gears, pinions on said gear shafts, racks operated by said card and turning said pinion in opposite directions and at the finish of the travel for selection, and an arm projecting from said gears and carrying the circuit selecting contact.

16. In a device of the class described, a frame having card guides and shaft bearings, an operating instrument in card form, a screw shaft journalled in said bearings, a rotator shaft journalled in said bearings, a rotator, a shifting carriage traveling on said screw shaft and engaging said rotator, type mounted on said rotator, a motor, a plurality of circuit breaking switches, electrical circuits to be completed respectively by the insertion of said card, and means from said carriage for engaging said circuit breakers in type selecting operations.

17. In a device of the class described, a frame having card guides and shaft bearings, an operating instrument in card form, a screw shaft journalled in said bearings, a rotator shaft journalled in said bearings, a rotator, type in circumferential and longitudinal rows mounted thereon, a shifting carriage on said screw shaft engaging said rotator, motive power, a plurality of electrical circuits, normally open, and closed respectively by the insertion of said card instrument, and type selector switches in said circuits operated from said carriage.

18. In a device of the class described, a frame having card guides and shaft bearings, an operating instrument in card form, a rotator shaft journalled in said bearings, a screw shaft journalled in said bearings, a rotator, type mounted thereon, a carriage mounted on said screw shaft and engaging each end of said rotator, an arm extending downwardly from said carriage motive power, a plurality of electric circuits, pole changing switches actuated by said card instrument a plurality of circuit breakers included in said circuits, and means for selecting the switch to be broken.

19. In a device of the class described, a frame having card guides, an operating instrument in card form, a rotator shaft, a rotator, type mounted thereon, a shifting mechanism for said rotator, means for operating said rotator and said shifting mechanism, a switch mechanism selectively connected with said operating means, and means for breaking the selected circuit in type finding operations.

20. In a device of the class described, a frame having card guides, an operating instrument in card form, a rotator shaft, a rotator, type mounted thereon, a shifting mechanism for said rotator, motive power, controlling switches, selector switches for said shifting means, limiting switches for said rotator, and an inserted card selecting the operating circuits.

21. In a device of the class described, a frame having card guides, an operating instrument in card form, a rotator shaft, a rotator, type mounted thereon, a shifting mechanism engaging said rotator, motive power, electrical connections, controller type selector switches for breaking connections, limiting switches for said rotator, and a member operated by the insertion and withdrawal of said card for engaging said controller and selecting the circuit in agreement with the card.

22. In a device of the class described, a frame having card guides, an operating instrument in card form, a rotator, a motor, type mounted on said rotator, electrical connections, a shifting mechanism, circuit selector switches for the latter, a controller, a selected circuit for said rotator, limiting switches for said rotator circuit and mechanism carrying operating members corresponding to said controller switches in number.

23. In a device of the class described, a frame having card guides, an operating instrument in card form, a rotator, type mounted thereon, motive power, electrical connections, a shifting mechanism, selector switches, limiting switches, a controller for forward and reverse movements and a member having spring members corresponding in number to the moving parts of said controller and adapted to select the rate for the calculation.

24. In a device of the class described, a frame having card guides, a card having shoulders formed at different depths and means for rate selecting, a rotator, type mounted thereon, motive power, electrical connections, a shifting mechanism, controller switches, selector switches, limiting switches for said rotator, means engaged first by one of said shoulders and finally by the other of said shoulders and selecting the operating circuit for said rotator and means engaged by said card for operating the controller switches.

25. In a device of the class described, a frame having card guides, a card having a rate hole in a selected place and otherwise shaped as an operating instrument, a printing mechanism, motive power, electrical connections, a shifting mechanism, selector switches, controller switches, a member having a row of movable members, one of which is adapted to register with said hole, in selecting the operating circuit for the shifting mechanism, and limiting switches operated in selecting the type groups of said printing mechanism.

26. In a device of the class described, a frame forming a card table and supporting the mechanism, a card as an operating instrument, electrical connections, motive power, shafts journalled in said frame, controllers, circuit selectors, limiting switches, electro-magnets energized on the operation of said switches and braking said shafts, and means for operating said controllers on the insertion of said card.

27. In a device of the class described, a frame forming the card table and supporting the mechanism, a card forming an operating instrument, motive power, a printing mechanism, a progressive shaft, a shifting member mounted on said shaft, a plurality of electrical circuits, controllers operated by the insertion of said card, type selector switches operated by said shifting member, electro-magnets deenergized on the operation of selector switches and braking said shaft, and means for operating said printing mechanism.

28. In a device of the class described, a frame forming the card table and supporting the mechanism, motive power, a card forming an operating instrument, a rotator shaft, a rotator, type mounted thereon, controllers operated by the insertion of said card, electrical connections, limiting switches, breaking said electrical connections, and electro-magnets deenergized on the operation of said limiting switches and braking said shaft.

29. In a device of the class described, a frame forming the card table and supporting the mechanism, a card forming an operating instrument, shafts journalled in said frame, a printing mechanism, electrical connections, means for selecting the type and an electro-magnet deenergized in the period between the forward and reverse movements and having its armature forming the impression stamping member of said printing mechanism.

30. In a device of the class described, a frame forming the card table and supporting the mechanism, a card forming an operating instrument, a rotator shaft, a rotator, type mounted thereon, a progressive shaft, a shifting member mounted thereon and engaging said rotator, a plurality of electrical circuits, controllers operated by the insertion of said card instrument, selector switches, electro-magnets stopping said shifting member and de-energized, on the operation of selector switches, limiting switches, electro-magnets stopping said rotator and de-energized on the operation of said limiting switches, an electro-magnet automatically de-energized between the forward and reverse movements of said rotator and shifting member and having a pivoted spring armature forming an impression stamp in said printing rotator, an inked ribbon, and motive power.

31. In a device of the class described, a printing drum having type in groups, each group having time and value members, said time type being progressive in quantity circumferentially and said value type being progressive in quantity longitudinally and circumferentially, means for reciprocating and rotating said drum and electrical selecting means controlled by the configuration of an inserted card for finding the group during the movement of the drum.

32. In a device of the class described, a printing drum having type in groups, each group having time and value members, said time type being progressive in quantity circumferentially and said value type being progressive in quantity longitudinally and circumferentially, means for reciprocating and rotating said drum, electrical means operable in finding the group, and an electromagnetically controlled platen co-operating with said selected type group in making the impression.

33. A recording machine comprising in combination, a type carrier and a printing platen, a plurality of groups of time representing type and a plurality of groups of value representing type on said carrier, means controlled by the configuration of an inserted card for automatically effecting a relative shifting of the type carrier and platen to thereby bring the proper time type to the printing point, and means controlled by the configuration of the inserted card for automatically effecting a different relative shifting of the carrier and platen to bring the proper and corresponding value type to the printing point.

34. The invention set forth in claim 33 in which means is provided for automatically actuating said platen to take an impression when the proper time and value type have been selected.

Signed at the city of Montreal, Quebec, Canada, this 15th day of May, 1919.

GEORGE WILLIAM ODELL.